US 8,276,780 B2

(12) United States Patent
Oltman (10) Patent No.: US 8,276,780 B2
(45) Date of Patent: Oct. 2, 2012

(54) FITTING TORQUE ARM RESTRAINT (75) Inventor: Darrell A. Oltman, Lincoln, NE (US)

(73) Assignee: Snyder Industries, Inc., Lincoln, NE (US)

( * ) Notice: Subject to any disclaimer, the term of this patent is extended or adjusted under 35 U.S.C. 154(b) by 408 days.

(21) Appl. No.: 12/621,365

(22) Filed: Nov. 18, 2009

(65) Prior Publication Data
US 2011/0114651 A1 May 19, 2011

(51) Int. Cl.
B65D 25/40 (2006.01)
B65D 6/00 (2006.01)
B65D 8/00 (2006.01)
B65D 6/40 (2006.01)
B65D 6/34 (2006.01)
B65D 8/08 (2006.01)

(52) U.S. Cl. ....... 220/661; 220/4.12; 220/565; 220/601; 220/694; 220/732; 222/573

(58) Field of Classification Search ................ 220/4.12, 220/565, 601, 639, 661, 694, 732; 222/573; 29/428
See application file for complete search history.

(56) References Cited

U.S. PATENT DOCUMENTS

| 5,374,026 A | 12/1994 | Spurrier et al. |
| 5,490,603 A | 2/1996 | Davis |
| 6,079,580 A | 6/2000 | Garton et al. |
| 6,247,594 B1 | 6/2001 | Garton |
| 6,318,581 B1 | 11/2001 | Garton |
| 6,474,496 B1 | 11/2002 | Garton |
| 6,484,899 B1 | 11/2002 | Garton |
| 7,195,284 B2 | 3/2007 | Garton et al. |
| 2003/0047563 A1* | 3/2003 | Reinelt et al. ................. 220/565 |

* cited by examiner

Primary Examiner — Anthony Stashick
Assistant Examiner — Madison L Poos
(74) Attorney, Agent, or Firm — Hovey Williams LLP (57) ABSTRACT A torque arm restraint is provided with a body having a bore including an axis and an arm extending from said body transversely to the axis and is adapted for resisting torque applied to the fitting of a liquid storage tank, and is configured either for mounting on a fitting or as a component of the fitting such as an outlet fitting mounting a pipe and extending from the wall of the tank. A tubular body permits passage of instrumentation or liquid therethrough and the arm may have an abutment surface positioned proximate the inside surface of the tank wall, either in engagement or in spaced relationship, whereby the arm resists torque applied to the fitting exteriorly of the tank. The body may include an attachment member which is adapted for mounting to a tank fitting, and may be coupled to a pipe within the tank.

21 Claims, 5 Drawing Sheets

FITTING TORQUE ARM RESTRAINT

BACKGROUND OF THE INVENTION

1. Field of the Invention

The present invention is concerned with a mechanical restraint to resist the influence of torque applied to fittings, particularly fittings of vessels such as fluid containment tanks. More particularly, it is directed to a fitting including a restraint and a restraint which can be mounted to a fitting and positioned interiorly of a fluid tank in order to avoid damage to the sealing integrity between the outlet assembly and the tank.

2. Description of the Prior Art

Vessels for holding liquids are used in a variety of industries and while they may be configured differently and constructed of various materials. A variety of different fittings for various purposes such as inlet, instrumentation and the like are provided on a tank. Fittings which are used as part of a discharge outlet may be of particular interest as they are often constructed to use gravity so as to discharge the liquid contents of the tank through a discharge outlet which often extends through a side wall of the tank and is located near the bottom wall of the tank. This arrangement is advantageous in that gravity supplies the necessary force to drain the liquid from the tank, and that various valves, hoses, pipes or other attachments can be coupled to the outlet fitting. Examples of just a few of the many types of tanks employing this concept may be seen, for example, in U.S. Pat. Nos. 6,079,580, 6,318,581, 6,474,496 and 6,484,899, the disclosures of which are incorporated herein by reference.

In tanks molded of synthetic resin, the fittings, such as outlet fittings, may either be coupled to an integrally molded outlet pipe or tubulation such as is shown in U.S. Pat. No. 6,079,580 or may be inserted into an opening in the sidewall of the tank as is shown in U.S. Pat. Nos. 6,474,496 and 6,484,899. To these fittings, further pipes, valves, hoses or other devices are often attached, as is shown for example in U.S. Pat. No. 7,195,284, the entire disclosure of which is incorporated herein by reference. These attachments to the fitting can become especially heavy, especially when filled with liquid. This in turn imparts a significant torque arm onto the sidewall of the tank. One partial answer to dealing with this stress is to provide additional support exteriorly of the tank for the extended pipe, as is shown in U.S. Pat. No. 7,195,284. However, such measures are often overlooked or removed, resulting in a cantilever support from the outlet fitting. Moreover, even when such support is provided, the length of a pipe and its fluid contents in a long length of pipe may still impart a significant stress on the portion of the tank adjacent the outlet. This stress can cause deformation, such as warping of the tank wall which results in leaks, or even worse, stress fractures which can destroy the usefulness of the tank.

Thus, there has developed a need for some device which can easily and economically counteract the torque which is applied to various types of fittings used on tanks and other vessels, and in particular outlet fittings.

SUMMARY OF THE INVENTION

This objective has largely been met by the fitting torque arm restraint of the present invention. That is to say, the present invention provides an economical solution to the problem of stress concentrations in the vicinity of fittings of various types, including fluid outlets, by providing a device which is incorporated into a fitting or can be mounted to an existing fitting of a tank to counteract the torque placed on the fitting and adjacent areas of the tank wall.

Because typical tank side walls are upright where fluid outlets are located on the side wall, they have much more strength in the vertical direction than in the horizontal. Thus, the downward vector force is typically in compression along the upright length of the wall, which is sufficient to support the weight of the tank, the outlet fitting, and any extension. The present invention can be mounted in proximity to horizontal, or inclined walls as well as vertical walls of a tank, and serves to distribute and offset much of the torque applied to the fitting by an outwardly extending arm which attaches to or is provided as a part of the fitting on the inside of the fitting and configured and positioned to press against the tank wall under conditions of excessive torque.

Broadly speaking, the torque arm restraint of the present invention includes a body provided either as a part of the fitting itself or as a coupler for attachment to a tank fitting and an arm which extends from the body. Preferably, the body is tubular in configuration for permitting liquid to flow therethrough, and more preferably is adapted for mounting conduits such as tubular elbows, pipe sections or the like. When provided as a restraint separate from the fitting, the restraint includes a threaded attachment member for threadable coupling to a fitting such as an outlet fitting. The coupler may include a pair of opposed bosses to facilitate receipt of a tool such as a wrench or the like for securely attaching the coupler to the fitting. The arm is preferably elongated and may be angled to extend both radially outwardly from the fitting and axially, or alternatively extend substantially perpendicular to a central axis extending through the body. The axial extension may be in a direction toward the attachment member and thus, when attached, extend from the body toward the interior surface of the wall of the tank in which it is received. The remote end of the arm is preferably provided with an abutment surface which is smooth and oriented and configured to lie either spaced in close proximity to or in full contact with an adjacent portion of the tank wall. The torque arm restraint hereof may be manufactured of a variety of different materials such as stainless steel, but an economical torque arm which is compatible with and less likely to damage many rotationally molded synthetic resin tanks may be molded of a variety of synthetic resins such as, for example, polyvinyl chloride, or most preferably glass-filled polypropylene. As noted above, the torque arm restraint may also be provided as an integral, unitary party of the fitting, typically as a part of an inside flange.

As a result, a lightweight and inexpensive solution to the problem of torque application to the a fitting such as an outlet fitting and surrounding areas of the tank is provided by the present invention. These and other advantages will be readily appreciated by those skilled in the art with reference to the attached drawings and following description.

DESCRIPTION OF THE PREFERRED EMBODIMENT

Figure 1:
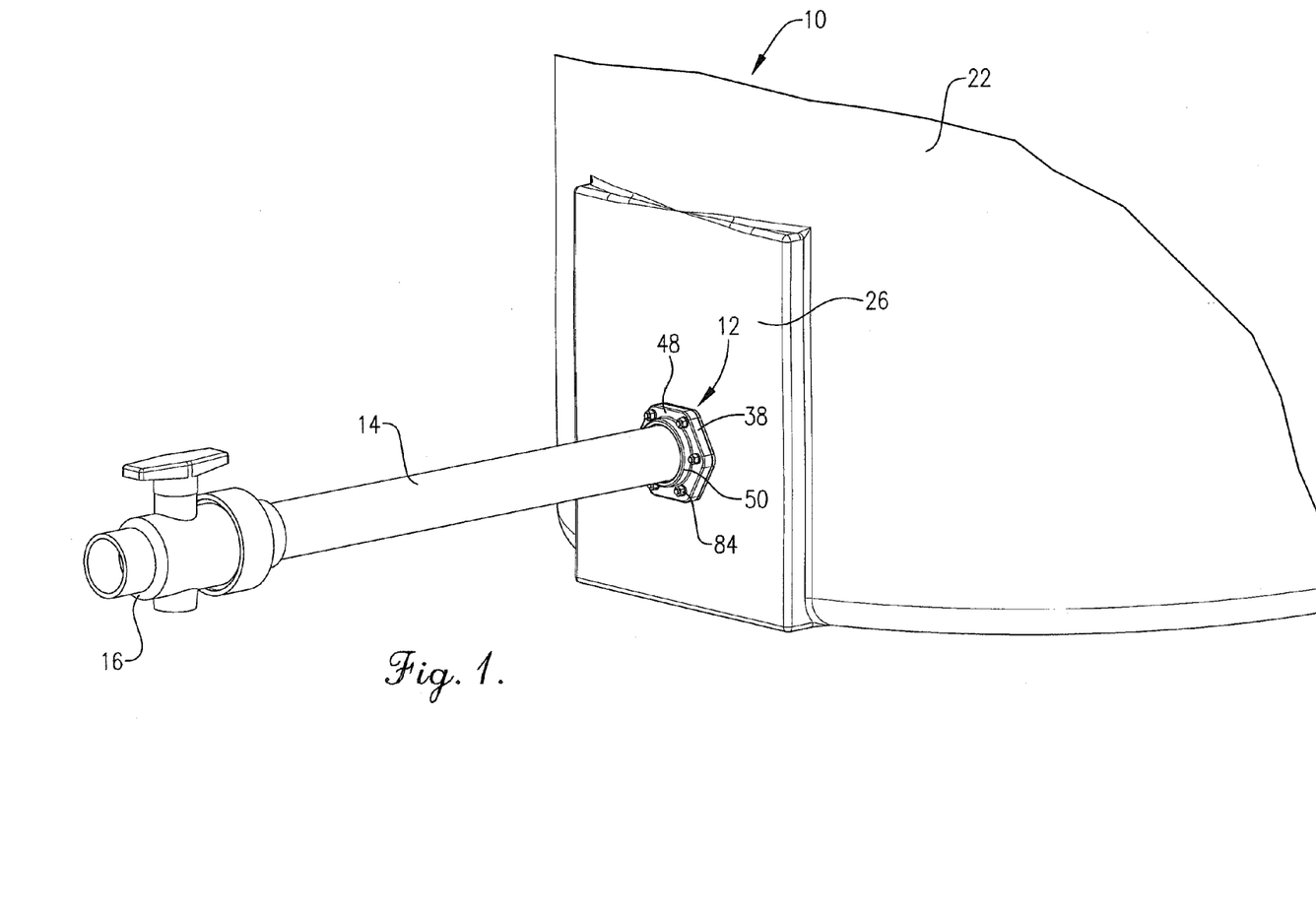
FIG. 1 is a fragmentary isometric view showing a portion of the exterior side of a fluid tank wall and fluid outlet fitting having an elongated pipe and valve attached thereto.
Figure 2:
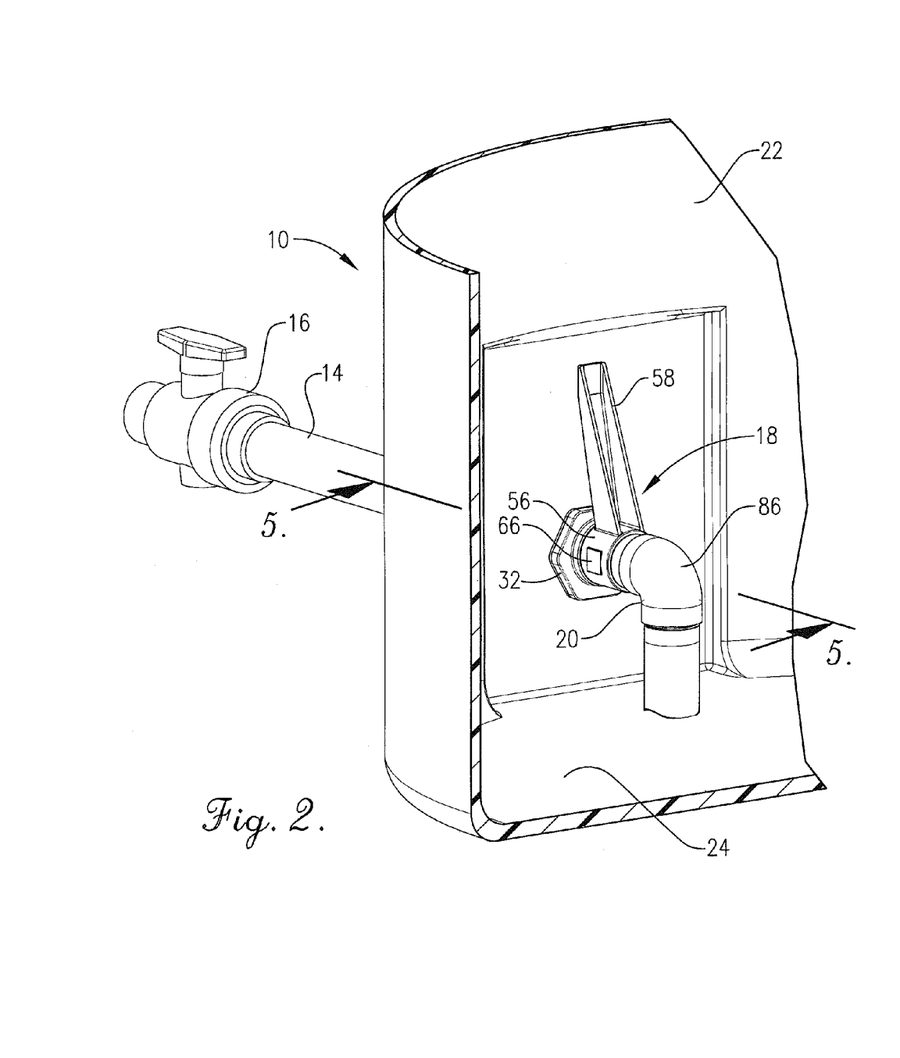
FIG. 2 is a fragmentary isometric view of the interior side of the portion of the tank wall showing a torque arm restraint in accordance with one embodiment of the present invention coupled to the outlet fitting and receiving thereon an outflow pipe.

Referring now to the drawings, a fluid storage tank 10 is provided with a fitting 12 as shown in FIGS. 1 and 2. While the preferred embodiment is shown as used in conjunction with a fitting used as an outlet fitting 12, it is to be appreciated that the present invention is not limited to use on outlet fittings but can be employed for use in conjunction with inlet, instrumentation and other types of fittings as well. As further illustrated in FIG. 1, the outlet fitting 12 is shown connected to an elongated pipe 14 to which a controllable valve 16 is connected. FIG. 2 shows the interior of the tank 10, with a first embodiment of a torque arm restraint 18 configured for mounting to an existing outlet fitting 12. An outflow pipe 20, used to collect liquid held within the tank 10 and deliver the collected liquid to the outlet fitting 12, is mounted to the torque arm restraint 18.

Figure 4:
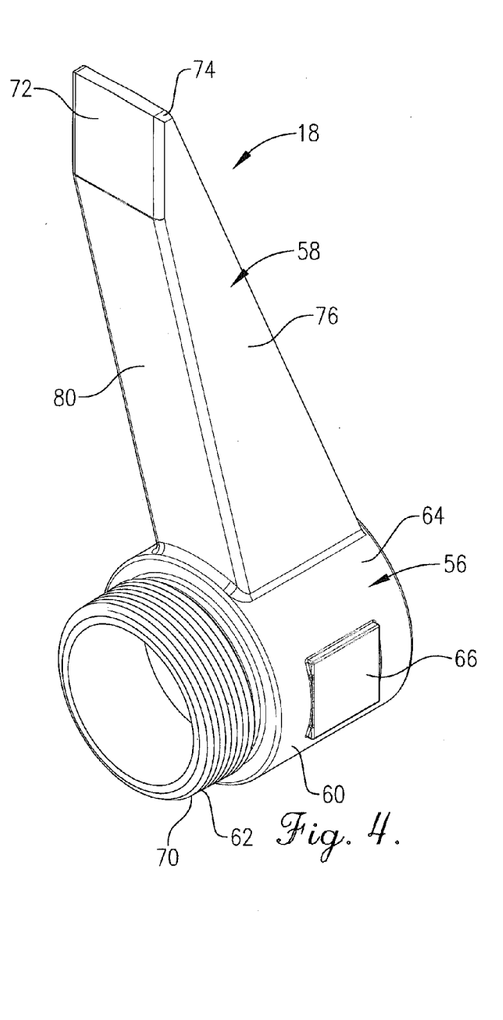
FIG. 4 is an enlarged, right front isometric view of the torque arm restraint shown in FIG. 2, showing a threaded attachment member of the coupler and a substantially planar abutment surface on the arm.

In greater detail, the tank 10 includes a surrounding side wall 22 and a bottom wall 24, which are preferably molded as a unitary member of synthetic resin such as high density polyethylene through rotational molding. The side wall 22 has an interior surface 25 and may be provided with an area of increased thickness and thus strength as panel 26. An opening 28, best seen in FIG. 4, is provided in the panel 26 to permit liquid stored in the interior of the tank 10 to be discharged. A plurality of holes 30 may be drilled or otherwise provided in the panel surrounding the opening 28 for mounting of the outlet fitting 12 thereto.

Figure 3:
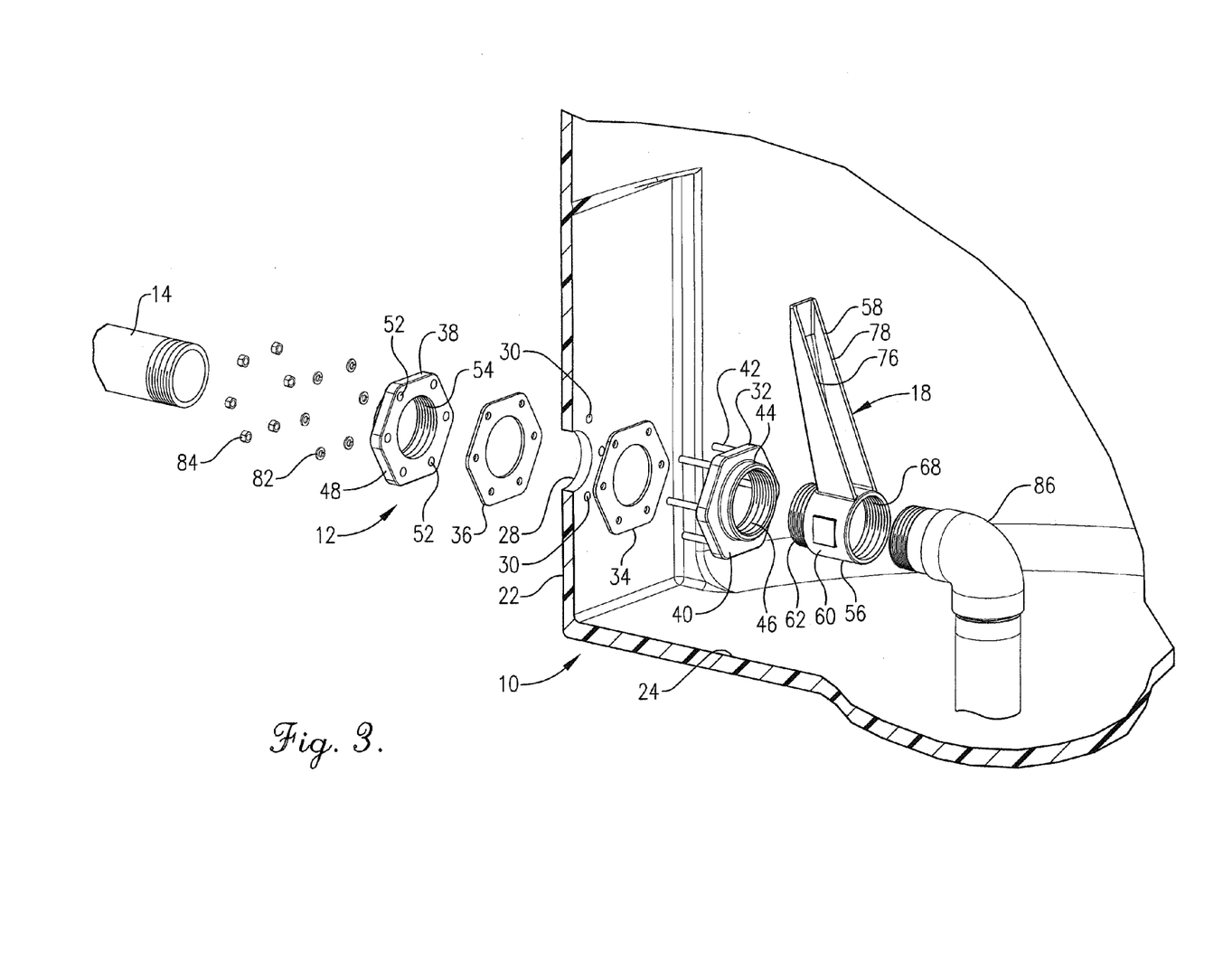
FIG. 3 is a fragmentary view through a section of the tank wall including an opening therethrough, and showing the outlet fitting, the torque arm restraint of FIG. 2 and outflow pipe in an exploded condition.

While a variety of differently configured fittings may be employed within the teachings of the present invention, the outlet fitting 12 shown in FIGS. 1 through 5 of the drawings of the of one of the preferred embodiment include, as shown in FIG. 3, an inside flange 32, gaskets 34 and 36, and an outside flange 38. The inside flange 32 has a surrounding shoulder 40 which mounts a plurality of axially extending threaded studs 42, and a neck 44 which, when mounted on the side wall 22 of the tank 10, extends interiorly. The inside flange 32 may be of a chemically resistant metal such as stainless steel, or alternatively of synthetic resin or other materials. For example, the inside flange 32 may be molded of glass filled chemically coupled polypropylene. The inside flange 32 has a bore 46 which extends through the shoulder 40 and neck 44 for permitting the passage of liquid therethrough.

The bore 46 is internally threaded, and a 3 inch NPT threaded bore meeting ANSI B2.1 standards would be one example of a threaded bore useful in the present invention. The outside flange 38 may also be provided of different, preferably chemically resistant materials such as stainless steel or a synthetic resin such as glass filled chemically coupled polypropylene. The outside flange 38 preferably has a rim 48 and a collar 50 extending outwardly therefrom when mounted on the exterior of the side wall 22 of the tank 10. The rim 48 has a plurality of holes 52 spaced complementally to receive the studs 42 of the inside flange 32 therethrough. The outside flange 38 also has an internally threaded passage 54 which is preferably sized and threaded complemental with the bore 46. Gaskets 34 and 36 are also provided with holes complementally configured with the arrangement of studs 42 and are preferably made of an elastomeric material for sealing around the opening 28. One suitable material for use in connection with the gaskets 34 and 36 is EPDM rubber.

Figure 5:
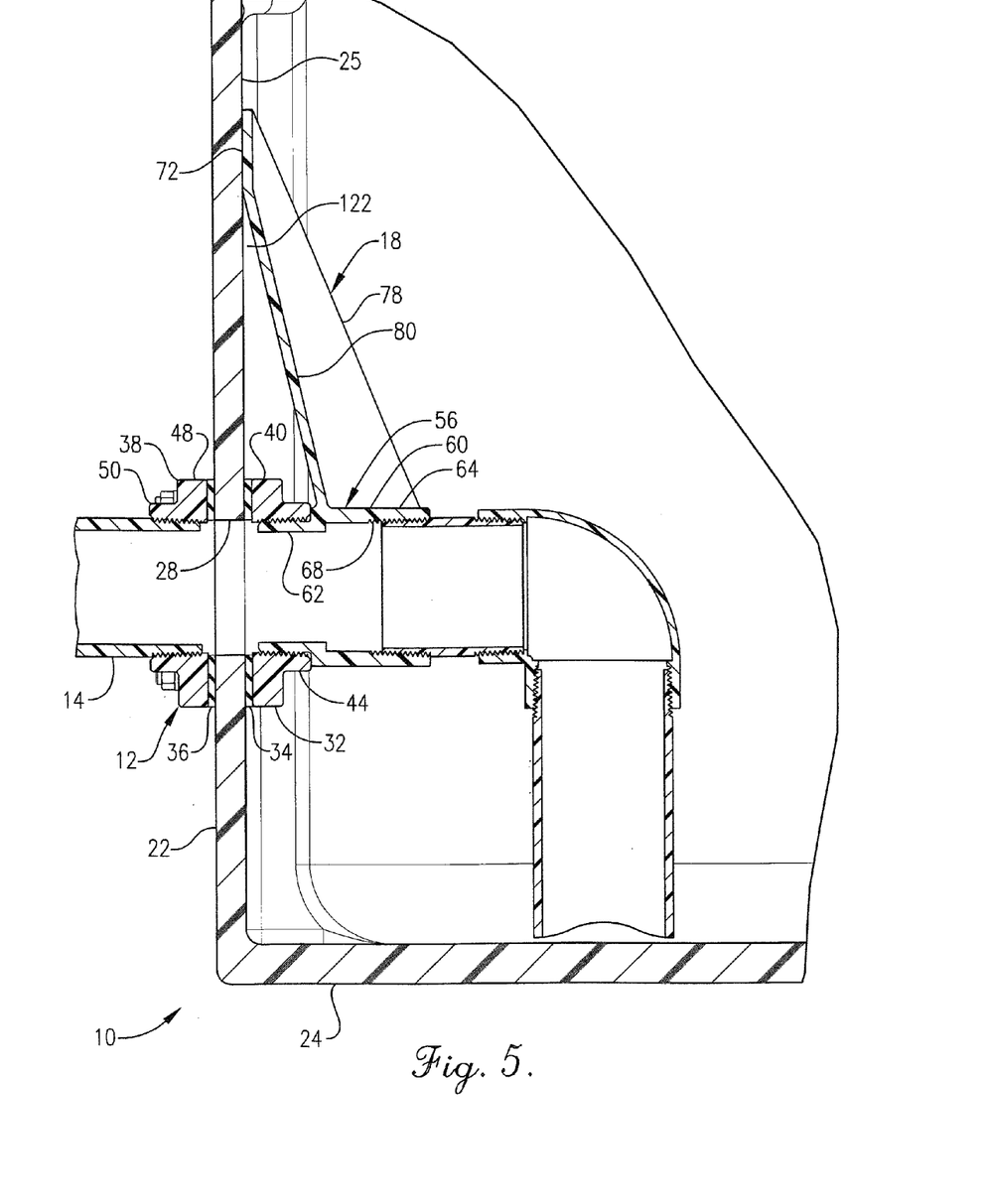
FIG. 5 is a vertical cross-sectional view taken along line 5-5 of FIG. 3 showing the tubular coupler of the torque arm restraint threadably connecting the outlet fitting and the outflow pipe.

The torque arm restraint 18 which is shown in greater detail in FIG. 4 and preferably includes a body 56 and an arm 58 extending outwardly from the body 56. The torque arm restraint 18 may be cast or machined of a chemically resistant metal such as stainless steel, or more preferably molded of glass filled chemically coupled polypropylene. The body 56 is preferably generally cylindrical in shape and tubular, and includes a coupler 60 having a threaded attachment member 62 extending from the coupler 60. The body 56 has an external surface 64 which may include a pair of diametrically positioned flat bosses 66 to which a tool such as a wrench may be applied for mounting the torque arm restraint onto the outlet fitting 12. The coupler 60 also has an internally threaded inner surface 68, preferably threaded with substantially the same diameter and thread pitch as that of the bore 46. The attachment member 62 is externally threaded with external threads 70 complemental to be threadably attached on the internal threads of the bore 46 of the inside flange 32 of the outlet fitting 12. As shown in FIGS. 2-5, the arm 58 extends radially outwardly from the body 56 at an angle so as also to extend somewhat axially in the same direction as the attachment member 62 extends from the body 56. When so displaced, an abutment surface 72 extends axially at least to, and as shown in FIG. 5, can be axially beyond the attachment member. The axially facing abutment surface 72 is located on a remote end 74 of the arm 58 in spaced relationship to the body. The abutment surface is oriented so as to be facing in the same direction as the attachment member 62 extends from the body 56 so that when the torque arm restraint 18 is mounted to a fitting, the abutment surface faces the interior surface 25 of the wall 22. The abutment surface 72 is preferably smooth and substantially planar, or otherwise complemental to the interior surface 25 of the panel 26. The arm 58 may be solid or include spaced side-by-side gussets or reinforcing walls 76 and 78 and forwardly facing connecting wall 80 to provide rigidity.

Figures 6, 7:
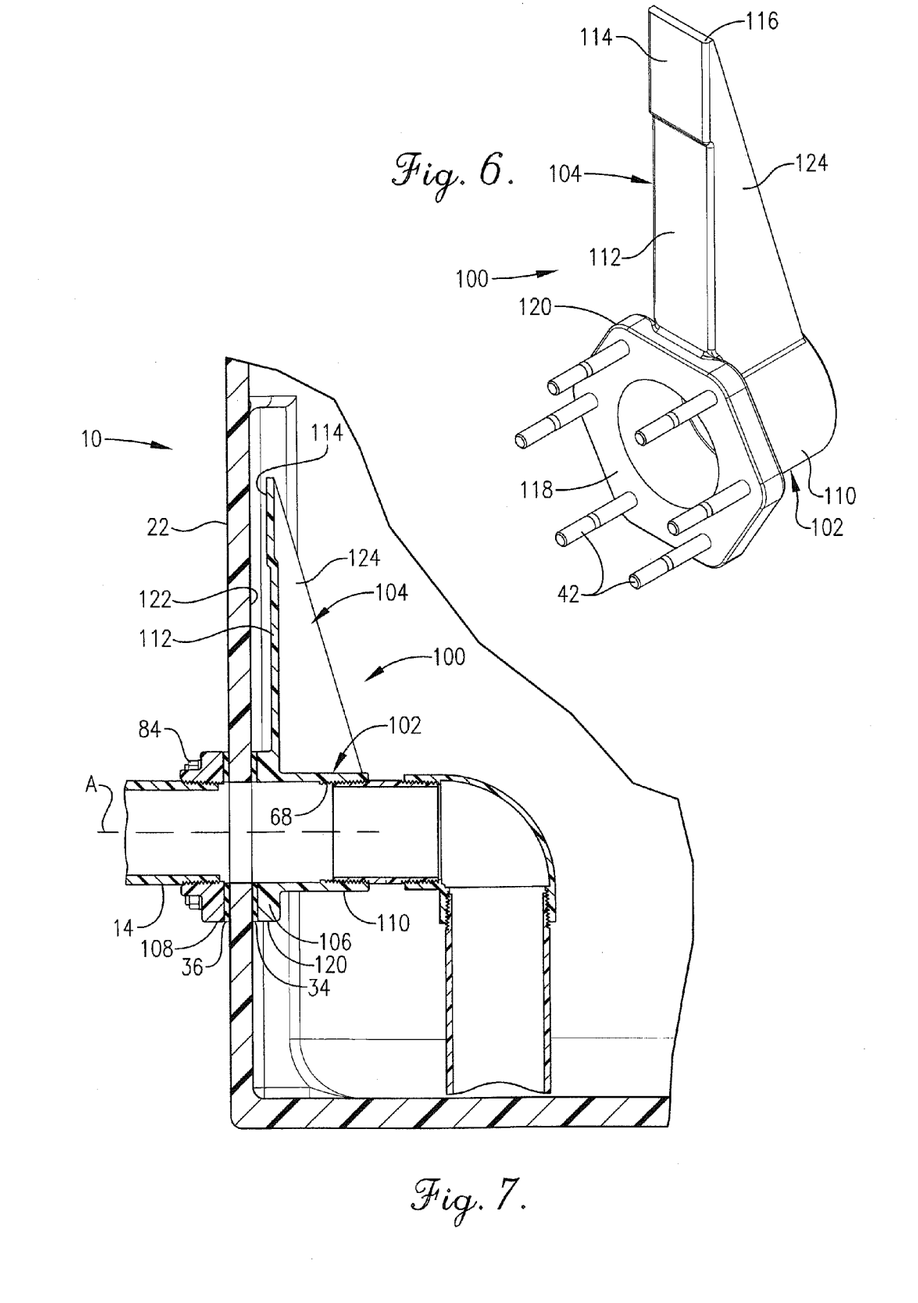
FIG. 6 is an isometric view of a second embodiment of the torque arm restraint hereof, provided as an integral, unitary part of a fitting component, wherein the arm is oriented to extend substantially perpendicular to a central axis through the body of the fitting.
FIG. 7 is a vertical cross-sectional view similar to FIG. 5, showing a portion of the tank wall to which the fitting including the torque arm restraint is mounted, with the arm extending perpendicular to the central axis through the body and the arm and abutment surface configured and arranged whereby the abutment surface is closely proximate to but in spaced relationship to the adjacent portion of the tank wall.

A second embodiment of the torque arm restraint 100 is shown in FIGS. 6 and 7, wherein like numbers are used to identify like elements of the embodiment shown in FIGS. 1-5. In this embodiment, the torque arm restraint 100 includes a body 102 and an arm 104 unitary and integral with the body 102 and extending transversely from central axis A of the tubular body 102. The body 102 is provided as an integral and unitary part of an inside flange 106 of the fitting 108. The fitting 108 includes an outside flange 38 and gaskets 34 and 36 as described above, and the inside flange 106 includes a bore 46 as described above. The inside flange 106 includes bolts 42 as described above for insertion in the complementally configured and arranged holes 52 of the outside flange 38, to which it is secured by nuts 84. The body 102 includes a coupler 110 having an internally threaded inner surface 68 adapted to mount an outflow pipe 20 or the like.

The arm 104 of the torque arm restraint 100 extends transversely to the axis A and as shown in FIGS. 6 and 7, may be substantially perpendicular to the axis A and have a forwardly facing wall 112 which, when mounted to an upright tank wall side wall 22, lies substantially parallel to the side wall 22. An abutment surface 114 is positioned at the remote end 116 of the arm 104. The arm 104 is configured such that the forwardly facing wall 112 and the abutment surface 114 are longitudinally recessed from a plane extending perpendicular to the axis A and parallel to a face 118 of a flange shoulder 120 of the inside flange 106. This configuration permits the abutment surface 114 to be spaced from an inside surface 122 of the side wall 22 when the torque arm restraint 100 is mounted to a tank 10. Consequently, the arm 104 is not preloaded, and comes into engagement with the wall 22 only when significant torque is imparted to the fitting 108. The arm 104 also includes a reinforcing wall 124 which extends between the body 102 and along the forwardly facing wall 112 and abutment surface 114.

In use, to compensate for the torque thus placed on the side wall 22 in the vicinity of the opening 28, the torque arm restraint 18 is mounted indirectly or directly to the inside flange 32. While in the drawings, the torque arm restraint 18 is shown as being threaded onto the inside flange 32 prior to assembly of the outlet fitting 12, it will be appreciated by those skilled in the art that other types of connection including but not limited to the use of clamps, bolted flanges, solvent welding and thermal welding can be used to connect the torque arm restraint 18 hereof to the inside flange 32 or to the other pipes, connections and fittings. When a threaded connection is employed as illustrated, threading of the torque arm restraint 18 onto the inside flange 32 prior to assembly is preferable because the transverse length of the arm 58 would engage the bottom wall 24 in many applications if the torque arm restraint 18 was threadably coupled to the outlet fitting after the latter was mounted to the side wall 22 of the tank. The outlet fitting 12 is mounted on the tank 10 as shown in FIG. 3, with the gaskets 34 and 36 placed in registry with the opening 28 on the respective inside and outside surfaces of the side wall 22. The inside flange 32 is positioned whereby its studs 42 extend through the smaller, surrounding holes in the gaskets 34 and 36 and then through the holes in the rim 48 of the outside flange 38. The components of the outlet fitting 12 are then secured using suitable washers 82 and nuts 84 as illustrated in FIG. 3. When the outlet fitting 12 is assembled, the abutment surface 72 may be in engagement with the inside surface of the wall 22 or panel 26, or may be spaced from but closely proximate the inside surface of the wall 22 or panel 26. The abutment surface extending transversely and laterally spaced at least one, and most preferably at least two outside diameters of the body 60 from the external surface 64.

The torque arm restraint 18 is particularly useful in mounting to existing tank fittings. However, when it is desired to provide a fitting as part of an original tank construction or to replace the inside flange of an existing fitting, torque arm restraint 100 which incorporates the inside flange 106 may be employed which provides the same advantages as torque arm restraint 18. The torque arm restraint 100 can be quickly mounted as described above, and as shown enables the arm 104 to position the abutment surface 114 in spaced relationship to the wall 22 or panel 26.

The outflow pipe 20, which as shown includes a pair of short pipe sections connected by an elbow 86, may be mounted by clamps, bolts, solvent welding, thermal welding or, as shown, by threading onto the body of the torque arm restraint 18. The open end of the outflow pipe 20 is preferably positioned proximate the bottom wall 24 of the tank 10 in order to collect liquid from that location within the interior of the tank 10. Valves, hoses or the like, such as the elongated pipe 14 and valve 16 are then threaded onto the outside flange 38 as shown in FIGS. 1, 3 and 5.

Torque is imparted to the outlet fitting 12 caused by the weight of the pipe 14, valve 16, any additional pipes and hoses, and the liquid contents residing in the pipe 14 and valve 16. This has a tendency to cause gaps between the side wall 22, gaskets 34 and 36, and the flanges 32 and 38, or to warp or otherwise deform the wall. The torque arm restraint 18 resists this torque, and thereby resists the formation of gaps which would cause leakage in the vicinity of the outlet fitting 12. The abutment surfaces 72 and 116 are preferably positioned substantially vertically above the inside flange of the outlet fitting 12 to best resist this torque, and are spaced from the body 56 or 102 transversely of the axis A through the body. Preferably, the abutment surfaces 72 and 116 are spaced from the external surface 64 of the body 56 or 102 a distance of at least one outside diameter of the body, and in some configurations preferably at least about two diameters of the body. The arms 58 and 104 extend from the body 60 or 102 to place the abutment surfaces 72 or 116 either in contact with the wall 22 or panel, or closely adjacent thereto. Most preferably, the angle between a central axis A through the tubular body and the forward facing wall of the arm 58 or 108 may be perpendicular as shown in FIGS. 6 and 7 and thus any angle of about 90 degrees or less. For example, in the arm 58 shown in FIGS. 1-5, the arm 58 is angled with the connecting wall 80, the angle being between about 45 degrees and 85 degrees, and more preferably about 70 to 80 degrees from a central axis A through the tubular body 60. This relationship helps to provide good torque resistance while permitting secure coupling of the attachment member 62 to the inside flange 32, and also to permit the inside flange 32 and the outside flange 38 to be tightened against the panel. The abutment surfaces 72 and 114 are preferably oriented in a plane which lies substantially perpendicular to the central axis A.

It may also be appreciated that in order to be able to withdraw most of the liquid held in the tank 12, the opening 28 must be sited and the discharge outlet 12 mounted closely adjacent the bottom wall 24 of the tank 10. The torque arm restraint 18 hereof, unlike an enlarged inside flange which would interfere with the bottom wall 24, is capable of mounting to an existing flange of an outlet fitting, but when assembled as described herein, does not interfere with the bottom wall 24 of the tank 10.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention. By way of example, the coupler could be attached to the outlet fitting by bayonet-type mountings, arms, clamps, bolted flanges, solvent welding or thermal welding instead of by threaded attachment, and a plurality of arms could be provided, or the abutment surface could be larger and extend continuously from the body outwardly. In addition, the torque arm restraint can be either directly mounted to the fitting as illustrated, or indirectly connected where short sections of pipe or other intermediate members are used between the torque arm restraint and the fitting.

The inventor hereby states his intent to rely on the Doctrine of Equivalents to determine and assess the reasonably fair scope of his invention as pertains to any apparatus not materially departing from but outside the literal scope of the invention as set out in the following claims.

The invention claimed is:

1. In combination, a liquid storage tank having a wall including an opening, and a fitting coupled to the wall and in registry with the opening, wherein the improvement comprises a restraint including a tubular body having a bore in registry with the opening and an arm connected to the fitting and extending transversely to an axis extending through the bore, the arm having an abutment surface spaced from the fitting and positioned adjacent the wall, wherein said restraint is separate from said fitting and includes a tubular coupler having an axially extending attachment member threadably mounted to said fitting.

2. The combination as set forth in claim 1, wherein said wall is a side wall, said tank further including a bottom wall, and wherein said fitting is an outlet fitting, the outlet fitting being coupled to the side wall in registry with the opening to permit the discharge of fluid through the outlet fitting.

3. The combination as set forth in claim 1, wherein the bore extends through the attachment member and the attachment member includes threads, and wherein said coupler is mounted to said outlet fitting.

4. The combination as set forth in claim 1, further comprising an outflow pipe positioned within the tank and mounted to said body.

5. The combination as set forth in claim 1, wherein the axis is a central axis and wherein said abutment surface is substantially planar and perpendicular to said central axis and positioned in spaced relationship to the body and positioned in spaced relationship to the wall.

6. The combination as set forth in claim 1, wherein said arm has a forwardly facing wall which is oriented toward said wall of the tank and extends at an angle between about 45 degrees and 90 degrees from the axis.

7. The combination as set forth in claim 1, wherein said tubular body is substantially cylindrical and said abutment surface is transversely spaced from said tubular body by a distance of at least one diameter of the tubular body.

8. In combination, a liquid storage tank having a wall including an opening, and a fitting coupled to the wall and in registry with the opening, wherein the improvement comprises a restraint including a tubular body having a bore in registry with the opening and an arm connected to the fitting and extending transversely to an axis extending through the bore, the arm having an abutment surface spaced from the fitting and positioned adjacent the wall, wherein the restraint includes a flange member forming an inside flange of the fitting, and wherein the body and arm are unitary with the flange member.

9. The combination as set forth in claim 8, wherein said tubular body is substantially cylindrical and said abutment surface is transversely spaced from said tubular body by a distance of at least one diameter of the tubular body.

10. The combination as set forth in claim 8, wherein said wall is a side wall, said tank further including a bottom wall, and wherein said fitting is an outlet fitting, the outlet fitting being coupled to the side wall in registry with the opening to permit the discharge of fluid through the outlet fitting.

11. The combination as set forth in claim 8, further comprising an outflow pipe positioned within the tank and mounted to said body.

12. The combination as set forth in claim 8, wherein the axis is a central axis and wherein said abutment surface is substantially planar and perpendicular to said central axis and positioned in spaced relationship to the body and positioned in spaced relationship to the wall.

13. The combination as set forth in claim 8, wherein said arm has a forwardly facing wall which is oriented toward said wall of the tank and extends at an angle between about 45 degrees and 90 degrees from the axis.

14. In combination, a liquid storage tank having a wall including an opening, and a fitting coupled to the wall and in registry with the opening, wherein the improvement comprises a restraint including a tubular body having a bore in registry with the opening and an arm connected to the fitting and extending transversely to an axis extending through the bore, the arm having an abutment surface spaced from the fitting and positioned adjacent the wall, wherein said restraint is unitary and molded of synthetic resin, and wherein said body includes a coupler having an internally threaded passage, an externally threaded attachment member extending axially from said body, and said arm includes a wall extending between said body and said abutment surface, said wall extending at an angle of between 45 degrees and 90 degrees relative to the axis.

15. The combination as set forth in claim 14, wherein said tubular body is substantially cylindrical and said abutment surface is transversely spaced from said tubular body by a distance of at least one diameter of the tubular body.

16. The combination as set forth in claim 14, wherein said wall is a side wall, said tank further including a bottom wall, and wherein said fitting is an outlet fitting, the outlet fitting being coupled to the side wall in registry with the opening to permit the discharge of fluid through the outlet fitting.

17. The combination as set forth in claim 14, further comprising an outflow pipe positioned within the tank and mounted to said body.

18. The combination as set forth in claim 14, wherein the axis is a central axis and wherein said abutment surface is substantially planar and perpendicular to said central axis and positioned in spaced relationship to the body and positioned in spaced relationship to the wall.

19. A method of reinforcing a connection between a liquid storage tank and a fitting mounted to a wall of the liquid storage tank, the fitting being mounted in registry with an opening in the wall, comprising the steps of:

providing a reinforcing member which is operatively coupled to at least a part of the fitting, the reinforcing member having a tubular body presenting a bore positioned in registry with the opening and an arm extending transversely from the body, the arm having an abutment surface laterally spaced from the body, the tubular body including a coupler;

positioning the abutment surface in proximity with an interior surface of the wall, including the step of operatively coupling a pipe to the fitting exteriorly of the wall of the tank and mounting said coupler directly to said fitting.

20. A method of reinforcing a connection between a liquid storage tank and a fitting mounted to a wall of the liquid storage tank, the fitting being mounted in registry with an opening in the wall, comprising the steps of:

providing a reinforcing member which is operatively coupled to at least a part of the fitting, the reinforcing member having a tubular body presenting a bore positioned in registry an arm extending transversely from the body, the arm having an abutment surface laterally spaced from the body, the tubular body including a coupler;

positioning the abutment surface in proximity with an interior surface of the wall, including the step of threading the coupler onto the fitting.

21. A method of reinforcing a connection between a liquid storage tank and a fitting mounted to a wall of the liquid storage tank, the fitting being mounted in registry with an opening in the wall, comprising the steps of:

providing a reinforcing member which is operatively coupled to at least a part of the fitting, the reinforcing member having a tubular body presenting a bore positioned in registry with the opening and an arm extending transversely from the body, the arm having an abutment surface laterally spaced from the body;

positioning the abutment surface in proximity with an interior surface of the wall, wherein said reinforcing member forms an inside flange component of the fitting including a flange member which is unitary with the body and the arm.

\* \* \* \* \*